(12) United States Patent
Ishida

(10) Patent No.: US 7,234,901 B2
(45) Date of Patent: Jun. 26, 2007

(54) THROW-AWAY TIP

(75) Inventor: Takuya Ishida, Yohkaichi (JP)

(73) Assignee: Kyocera Corporation, Kyoto (JP)

( * ) Notice: Subject to any disclaimer, the term of this patent is extended or adjusted under 35 U.S.C. 154(b) by 155 days.

(21) Appl. No.: 10/659,933

(22) Filed: Sep. 11, 2003

(65) Prior Publication Data
US 2004/0045426 A1 Mar. 11, 2004

(30) Foreign Application Priority Data
Sep. 11, 2002 (JP) ............................ 2002-266016
Dec. 25, 2002 (JP) ............................ 2002-375529
Mar. 18, 2003 (JP) ............................ 2003-073199

(51) Int. Cl.
*B23B 27/16* (2006.01)

(52) U.S. Cl. ........................................ 407/114; 407/115

(58) Field of Classification Search ................ 407/113, 407/114, 115, 116; *B23B 27/16*
See application file for complete search history.

(56) References Cited

U.S. PATENT DOCUMENTS

| | | | | |
|---|---|---|---|---|
| 4,606,679 A | * | 8/1986 | Jeremias | 407/114 |
| 5,116,167 A | * | 5/1992 | Niebauer | 407/114 |
| 5,122,017 A | * | 6/1992 | Niebauer | 407/114 |
| 5,476,346 A | * | 12/1995 | Lundstrom | 407/114 |
| 5,743,681 A | * | 4/1998 | Wiman et al. | 407/114 |
| 5,897,272 A | * | 4/1999 | Wiman et al. | 407/114 |
| 6,123,488 A | | 9/2000 | Kasperik et al. | |
| 6,241,430 B1 | * | 6/2001 | Norstrom | 407/114 |
| 6,607,335 B2 | * | 8/2003 | Morgulis | 407/40 |
| 6,715,967 B2 | * | 4/2004 | Wiman et al. | 407/114 |

FOREIGN PATENT DOCUMENTS

| | | | |
|---|---|---|---|
| DE | 1193010 | | 4/2002 |
| JP | 5488991 A | * | 6/1979 |
| JP | 58-098104 | | 7/1983 |
| JP | 62-121004 | | 7/1987 |
| JP | 05-53807 | | 7/1993 |
| JP | 06-23604 | | 2/1994 |
| JP | 08-39306 | | 2/1996 |
| JP | 11-277307 | | 10/1999 |

* cited by examiner

*Primary Examiner*—Daniel W. Howell
*Assistant Examiner*—Sara Addisu
(74) *Attorney, Agent, or Firm*—Hogan & Hartson LLP

(57) ABSTRACT

A throw-away tip of which two principal surfaces each has a land surface provided along the periphery thereof, a central surface provided on the inside of the land surface, a recess (a chip breaker groove) interposed therebetween, and at least one protrusion that extends from the central surface toward the land surface, wherein height of the land surface is made equal to the height of at least the top surface of the protrusion so that at least the top surface of the protrusion of the central surface and the land surface both serve as contact surface is provided.

22 Claims, 9 Drawing Sheets

THROW-AWAY TIP

BACKGROUND OF THE INVENTION

1. Field of the Invention

The present invention relates to a throw-away style cutting tip used for cutting a cast iron and a steel.

2. Description of Related Art

Throw-away style cutting tips have been used for cutting a cast iron and a steel. Throw-away tips that have modified rake face configurations have been known, such as those having a chip breaker formed in the rake face so as to protect the rake face from being damaged by removed metal chips, and those having a land formed near a cutting edge along the periphery of the rake face in order to prevent damage from cutting resistance or the like.

Throw-away tips having chip breakers and lands formed on both sides have such an advantage as both sides can be used in cutting operations. When such a throw-away tip has the cutting edge on one side worn out, the throw-away tip is turned over so as to carry out cutting operation using the cutting edge on the opposite side. A throw-away tip that uses the edge on either side by turning over is generally designed such that height of the land 25 is lower than a seating surface 27 (middle of the rake face) (h>0) as shown in FIG. 13, in order to prevent the cutting edge from making contact with a tool holder and being damaged (see, for example, Japanese Unexamined Patent Publication No. 8-39306).

However, according to the throw-away tip described above, height of a tip-corner 33 that has the greatest effect on attaching (seating) of the throw-away tip 21 becomes lower. Therefore, when the throw-away tip is used in a cutting operation under conditions involving severe impact, a cutting edge 24 located at the bottom surface (seating surface) of the throw-away tip 21 is lifted. As a result, seating of the throw-away tip 21 becomes insecure thus leading to vibration of the corner 33 during cutting operation. This causes the possibility of the cutting edge 24 located at the bottom surface of the throw-away tip 21 hitting the seating surface of the tool holder intermittently and resulting in breaking (breaking on the back), and/or chattering vibration of the throw-away tip which may cause chipping of the cutting edge 24 engaged in the cutting operation, during cutting.

To avoid such problems, Japanese Unexamined Patent Publication No. 11-277307 discloses a throw-away tip that has so-called full-circumference chip breaker comprising the land 25 and a central surface 27 having similar configuration to the land 25, wherein the land 25 and the central surface 27 are formed at the same height so as to secure the seating of the throw-away tip 21, prevent breaking on the back and reduce the cutting resistance.

The throw-away tip 21 of full-circumference chip breaker, however, also has such a problem that, in case the land 25 of the rake face is damaged due to chipping of the edge 24 or a crater wear during cutting operation with one side of the throw-away tip, the damaged land 25 at a corner portion 33 that has the greatest effect on seating of the throw-away tip 21 cannot provide satisfactory seating surface when the throw-away tip 21 is turned over. As a result, stability of seating is lowered while undesirable movements of the throw-away tip 21 such as lifting and chattering vibration cannot be suppressed and causing such problems as tool damage and/or rough machined surface.

There is also such a problem that, the longer the land surface on one side of the principal surface, the lower the rigidity and more susceptible to deflection. Particularly when used in a cutting operation under conditions involving severe impact, deflection of the land surface causes chattering vibration which may result in damage of the cutting edge. This problem becomes particularly conspicuous in a throw-away tip having diamond shape that has longer on one side line of the principal surface.

The above-mentioned Japanese Unexamined Patent Publication No. 11-277307 describes that cutting resistance is reduced by forming the chip breaker. However, since the chip breaker gradually warps over a wide area, chips tend to entangle when cutting a material of which chips are hard to break such as steel, thus resulting in such a problem that chips are caught between the cutting tool edge and the workpiece thus disabling stable cutting operation. Also in the case of the above-mentioned publication, since the chip breaker groove is wider and accordingly proportion of the contact surface to the entire seating surface is not sufficient, there is a weakness in securely fastening the throw-away tip.

Moreover, simply decreasing the width of the chip breaker groove reduces the effect of warping the chips and breaking them. When the chip breaker is made narrower and deeper, there arises the possibility that chip flow of discharging the chips from the cutting zone is comprised, resulting in such a problem that chips are caught around the cutting tool edge or the chip breaker groove.

SUMMARY OF THE INVENTION

In order to solve the problem described above, the present invention provides a land along the periphery of the principal surface of the throw-away tip, and at least one protrusion that extends from the flat central surface toward the land. The land and the protrusion are formed at the same height. This configuration makes it possible to cause an area around the corner, that has the greatest effect on seating of the throw-away tip, to serve as the contact surface that makes contact with the tool holder, thus stabilizing the seating of the throw-away tip. As a result, even when the cutting edge on one side is broken during cutting operation, the area around the broken cutting edge is prevented from being lifted from the tool holder, and therefore breakage on the back can be prevented from being caused by the vibration during cutting operation. Moreover, chattering vibration of the throw-away tip can be prevented from occurring, thus preventing the cutting edge engaged in the cutting operation from being broken and enabling it to provide smooth finish of the machined surface.

Throw-away tip of the present invention has substantially flat plate configuration, wherein two principal surfaces provide rake faces and seating surfaces, side surfaces provide relief faces and the intersects of the principal surfaces and the relief faces forming cutting edges. A land surface is provided along the periphery of each of the two principal surfaces, and a central surface is provided on the inside of the land surface with a recess (namely, chip breaker groove or the like) interposed therebetween. At least one protrusion is provided so as to extend from the central surface toward the land surface. Since the land and the protrusion are formed at the same height, at least the top surface of the protrusion (namely the plane part at the distal end of the protrusion) of the central surface and the land surface both sever as the contact surfaces. The protrusion is preferably formed in an acute angle at the distal end thereof.

Further according to the present invention, it is preferable to provide a linkage portion that connects the protrusion and the land surface. The linkage portion improves the seating stability during cutting operation, and also reinforces the land surface. As a result, chattering vibration of the land surface can be prevented from occurring during cutting operation, thus preventing the cutting edge engaged in the cutting operation from being broken and enabling it to provide smooth finished surface. The linkage portion is most preferable in cases where the principal surface has a polygonal shape such as diamond shape.

In the present invention, the recess (chip breaker groove) is dimensioned in a range from 0.1 mm to 0.6 mm in depth ($h_1$), from 0.7 mm to 2 mm in width (w), from 0.3 mm to 1.5 mm in width ($w_1$) from the land surface side to the bottom of the recess, and from 0.5 mm to 1.7 mm in width ($w_2$) from the bottom of the recess to the central surface.

The recess (chip breaker groove) is substantially V-shaped such that the bottom is a steep slope on the land surface side and is a gentle slope on the central surface side. The recess is also formed to have as small width as possible. This makes it possible to properly warp and break chips and discharge the chips smoothly out of the cutting zone, while maintaining the stability of seating on the seating surface. Because the chip removing performance is excellent, stable cutting operation can be achieved even when cutting tough materials such as steel wherein strong impact is generated, or cutting a composite material such as steel and cast iron held together.

DESCRIPTION OF PREFERRED EMBODIMENTS

Figure 1A:
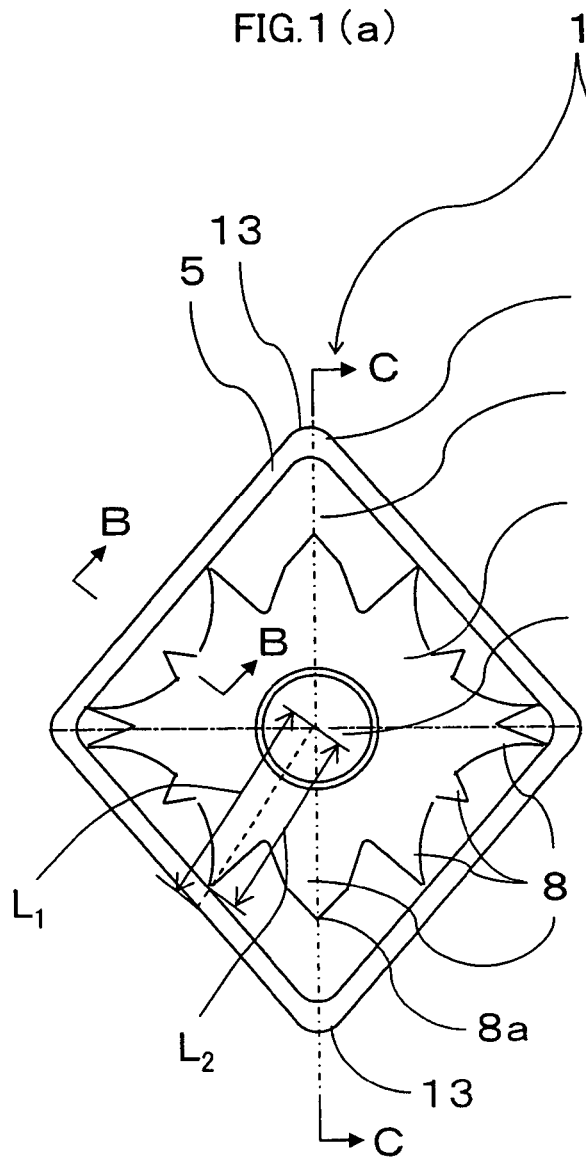
FIG. 1(a) is a plan view schematically showing one embodiment of the present invention.
Figure 1B:
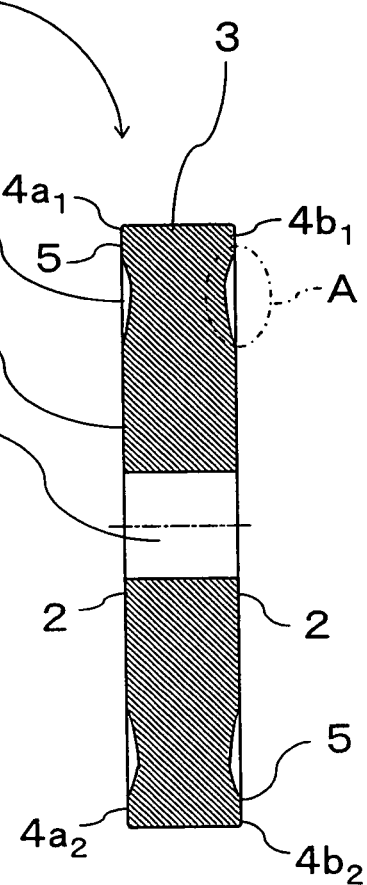
FIG. 1(b) is a schematic sectional view taken along the line C—C in the same.

One embodiment of a throw-away tip of the present invention will be described below with reference to FIG. 1(a) and FIG. 1(b). Making reference to FIG. 1, the throw-away tip 1 is a substantially flat plate of polygonal shape that has principal surface 2 providing rake face and seating surface, and relief faces 3 on the side surfaces. Intersects of the principal surfaces 2 and the relief faces 3 form cutting edges 4 (cutting edge 4a that engages in cutting operation and cutting edge 4b located on the seating surface). A flat land surface 5 is formed in parallel to the seating surface along the periphery of the principal surface 2. The central portion of the principal surface 2 of the throw-away tip 1 has a central surface 7 that is parallel to the seating surface and is flat. Provided between the land surface 5 and the central surface 7 is a chip breaker groove 6 that serves as a chip breaker.

At least one protrusion 8 is provided that extends from the central surface 7 toward the land surface 5. The protrusion 8, at least the top surface thereof, is formed at the same height as the land surface 5. This configuration makes it possible to cause the land surface 5 to serve as the contact surface (seating surface) so as to stabilize the seating of the throw-away tip 1, particularly the contact surface that makes contact with the tool holder, and prevent the cutting edge 4b from making chattering vibration or being broken on the back due to lifting on the cutting edge 4b during cutting operation. In case the throw-away tip 1 is supported on the land surface 5 alone, seating of the throw-away tip 1 becomes unstable when a cutting load is applied to the land surface 5. When the throw-away tip 1 is seated on at least the top surface of the protrusion 8 in the central surface 7 as well as on the land surface 5, in contrast, cutting load applied on the land surface 5 can be reduced and the throw-away tip 1 can be seated also on the outside of the throw-away tip 1. This configuration stabilizes the seating of the throw-away tip 1 and constrains lifting of the cutting edge 4b portion.

In case the land surface 5 is lower than the top surface of the protrusion 8, the cutting edge 4b portion is lifted during cutting operation, causing intermittent impact on the cutting edge and the central surface on the mounted side of the throw-away tip 1, resulting in breakage on back or chipping. In case the land surface 5 is higher than the top surface of the protrusion 8, on the other hand, seating is stabilized and lifting can be suppressed, but at the same time cutting load is concentrated on the land surface 5, thus leading to breakage on back or chipping.

Also because the land surface 5 may be damaged by the wear, chipping or the like during cutting operation, the land surface 5 of the nose 4 does not serve as the contact surface when the throw-away tip 1 is turned over and put into use. As a result, when cutting load is applied to the nose 4, seating is not stable and lifting and/or chattering vibration occurs because the nose 4 does not have contact surface beneath it. When the protrusion 8 is provided, since the seating surface is located nearer to the land surface 5, stability of seating can be maintained even when the land surface 5 is damaged.

In order to make the land surface 5 and the top surface of the protrusion 8 equal in height, the sintered body having the sintered surface without ground, that the land surface 5 and the top surface of the protrusion 8 is formed to be a certain height, may be used as throw-away tip. It, however, is preferable that the throw-away tip is sintered with the land surface 5 and the top surface of the protrusion 8 being formed to be higher than the desired height, and is ground on the land surface 5 and the top surface of the protrusion 8 at the same time. Effects on the present invention are not lost even when there is a difference of up to 0.05 mm in height between the land surface 5 and the top surface of the protrusion 8 due to variations in the machining process.

Figure 2:
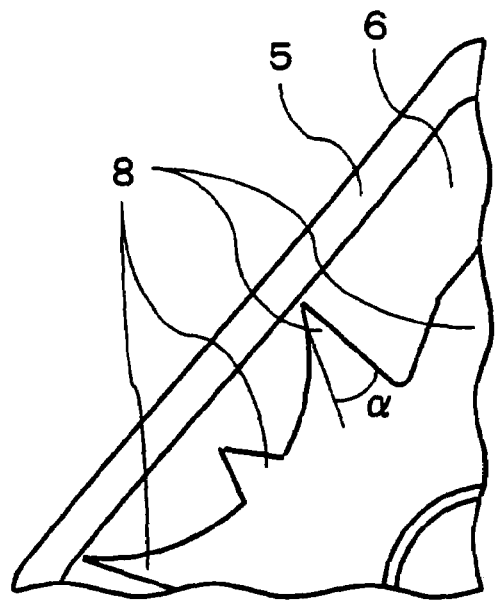
FIG. 2 is an enlarged partial plan view of FIG. 1(a).

Seating of the throw-away tip 1 can be improved further by providing a plurality of protrusions 8 outside the central surface 7 to such an extent as the cutting operation will not be affected. Angle α of the protrusion 8 at the distal end thereof is preferably an acute angle, particularly with 60° as shown in FIG. 2, since this makes it possible to arrange more protrusions 8 near the land surface 5 of the throw-away tip 1. These protrusions 8 can be functioned as a chip breaker.

It is also desirable that one of the protrusions 8 of the throw-away tip 1 extends toward the corner 13 of the throw-away tip 1, and there is one or more protrusion 8 that extends between two corners 13. Since the protrusions 8 that extend toward the corners 13 provide both seating surface and effects of chip breaking, direction of chip removal can be made constant and cutting resistance can be reduced. Moreover, stability of seating is improved further by providing one or more protrusion 8 between two corners 13.

A ratio ($L_2/L_1$) of the distance $L_2$ from the center of the throw-away tip 1 to the distal end of the protrusion 8 to the distance $L_1$ from the center of the throw-away tip 1 to the periphery of the throw-away tip is preferably in a range from 0.7 to 0.95. Such a value makes is possible to maintain the stability of seating of the throw-away tip 1, especially the seating surface, even when there is a breakage in the land surface or a difference of height between the land surface 5 and the central surface 7 due to variation in the machining process. In case the ratio is less than 0.7, seating becomes unstable when the land surface 5 is broken. In case the ratio is higher than 0.95, chip removal property is deteriorated and cutting resistance becomes large, thus tending to generate the chattering vibration and chipping.

As shown in FIG. 1, a clamp hole 17 is formed at the center of the throw-away tip 1. A lever, a screw or the like (not shown) is inserted into the clamp hole 17, and the throw-away tip is fastened by pressing the inner wall of the clamp hole 17 to a holder restriction surface side. However, the present invention is not limited to the clamp attaching system of the throw-away tip, and the lever-lock attaching system using the lever as mentioned above, the screw-clamp attaching system using the screw may also be employed. Further, top-clamp attaching system using the throw-away tip not having the clamp hole 17 may be employed.

In case width of the land surface 5 is in a range from 0.2 to 0.5 mm, it is made possible to improve the strength of the cutting edge, improve the stability of seating the throw-away tip 1 on the seating surface (contact surface), increase the strength against breaking on the back and prevent breakage and chipping from occurring by improving the chip removing performance and suppressing the increase in cutting resistance.

Figure 3:
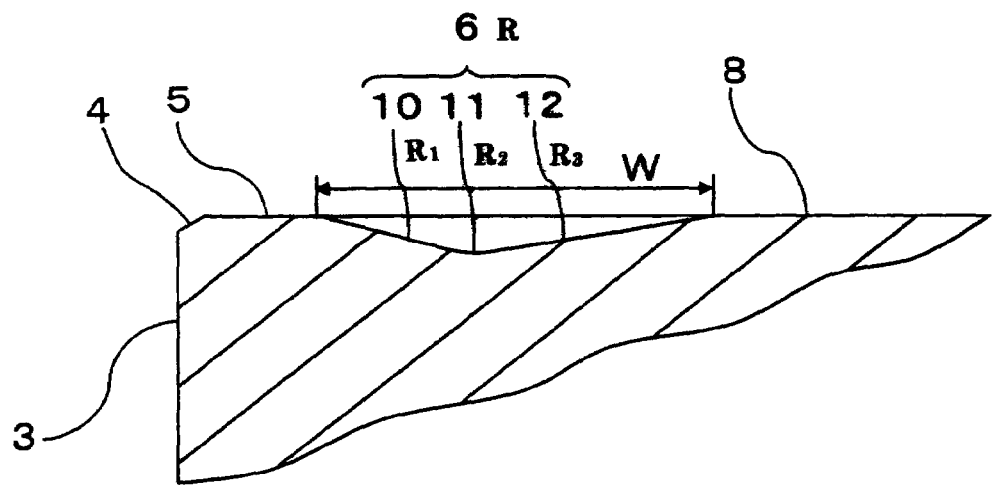
FIG. 3 is a schematic enlarged sectional view of portion A in FIG. 1(b).

As shown in FIG. 3, the chip breaker groove 6 formed between the land surface 5 and the central surface 7 consists of three curved surfaces (R); a curved surface ($R_1$) 10 located on the land surface 5 side, a curved surface ($R_2$) 11 that continues to the curved surface $R_1$ 10 and is located on the bottom of the chip breaker groove 6, and a curved surface ($R_3$) 12 that continues to the curved surface $R_2$ 11 and is located on the central surface side. This structure makes it possible, in addition to the effect of the chip breaker to reduce the cutting resistance, to increase the chipping resistance, make the chip removal smoother so as to prevent breakage due to jamming of chips, and to maintain the areas of the central surface 7 that provides seating and the protrusion 8.

In case that a main purpose is to reduce the cutting resistance in order to process a cast iron, the chip breaker groove 6 is preferably formed with the curved surface $R_1$ 10 having radius of curvature in a range from 15 to 17 mm. For the purpose of decreasing the length of the chip breaker groove 6 and stabilize the seating while maintaining the flow of chips, radius of curvature of the curved surface $R_2$ 11 is in a range from 1 to 2 mm, preferably from 1 to 1.5 mm. For the purpose of making the chip removal smoother and preventing the tool from being broken due to jamming of chips, radius of curvature of the curved surface $R_3$ 12 is in a range from 22 to 24 mm.

While the cutting edge 4 may be a sharp edge, it is preferable to perform processing of C surface (chamfer honing surface or taper surface) or R surface (round honing surface or curved surface) to the cutting edge 4. Such a configuration increases the strength of the cutting edge 4, and reduces the cutting resistance, and thereby makes it possible to prevent chipping or breakage from occurring on the cutting edge 4.

Also as show in FIG. 1, ratio of the area of the central surface 7 and the land surface 5 (namely the contact surface) in the principal surface 2 is preferably from 50 to 90%. This makes it possible to stabilize the seating. Further, chip removal property is increased, and cutting resistance is lowered. As a result, lifting and chattering vibration is suppressed, thereby preventing breakage on the back and chipping from occurring.

Figure 4:
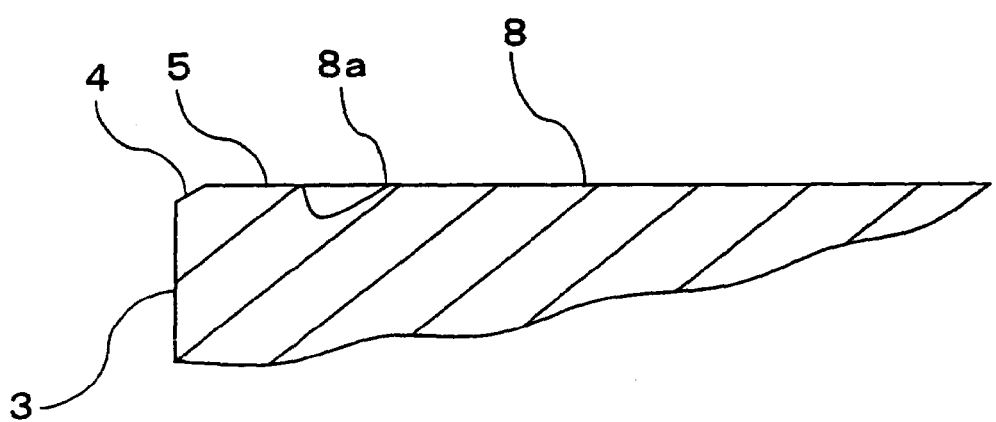
FIG. 4 is a schematic enlarged sectional view taken along the line B—B in FIG. 1(a).

It is also preferable that distance (w) between the distal end 8a of the protrusion 8 that is located at the same height as the central surface 7 and the land surface 5 is within 0.5 mm and, as shown in FIG. 4, height of the distal end 8a of the protrusion decreases by an angle in a range from 10 to 60° toward the land surface 5. This configuration makes it possible for the operator to visually check the clearance between the land surface 5 and the distal end of the protrusion 8 to decrease as the principal surface is ground, and therefore it is made easier to monitor the grinding process, so that variation in flatness in the principal surface 2 upon machining can be prevented.

Figure 5:
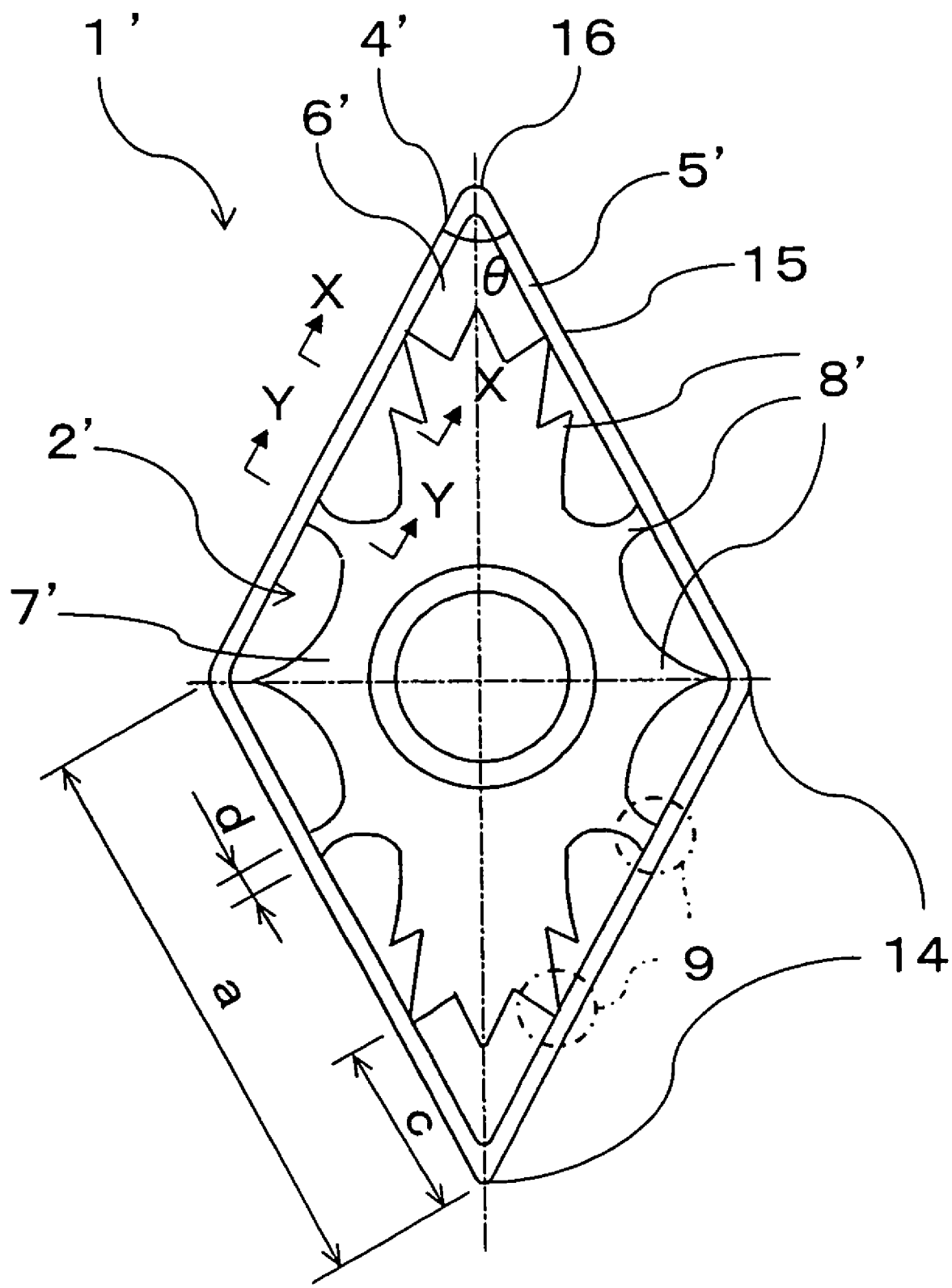
FIG. 5 is a plan view schematically showing another embodiment of the present invention.

Now another embodiment of the present invention will be described below with reference to FIG. 5 and FIG. 6. As shown in FIG. 5, the principal surface of a throw-away tip 1' has substantially polygonal flat plate shape such as diamond shape. A polygonal principal surface 2' that forms the rake face and the seating surface consists of a corner 14 (the corner 14 that cuts into the workpiece is called the nose) and side 15. Side surfaces serve as relief surfaces 3' (see FIG. 6). Intersect of the principal surface 2' and the relief face 3' constitutes the cutting edge 4'. A land surface 5' that is flat and parallel to the seating surface is provided along the periphery of the principal surface 2'. A central surface 7' that is flat and parallel to the seating surface is provided at the center of the principal surface 2' of the throw-away tip 1'. A chip breaker groove 6' (recess) is provided between the land surface 5' and the central surface 7'.

Figure 6:
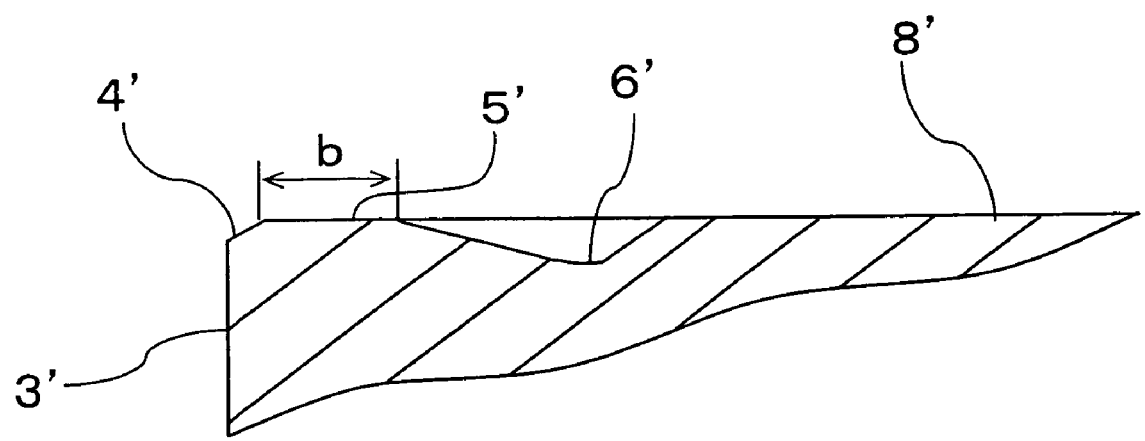
FIG. 6(a) is a schematic enlarged sectional view taken along the line X—X in FIG. 5.
FIG. 6(b) is a schematic enlarged sectional view taken along the line Y—Y in FIG. 5.
Figure 6:
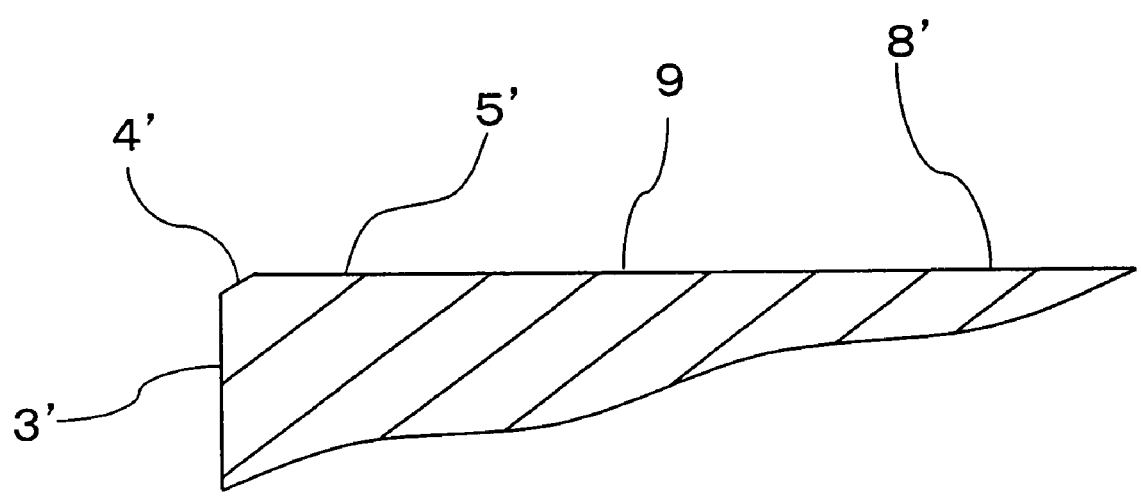

According to the present invention, at least one protrusion 8' is provided to extend over the central surface 7' toward the land surface 5', while a linkage portion 9 is provided between the land surface 5' and the protrusion 8' as shown in FIG. 5 and FIG. 6. The linkage portion 9 reinforces the land surface 5 and increases the rigidity of the throw-away tip. Since the protrusion 8 that continues from the center of the rake face over the same surface improves the stability of seating of the throw-away tip, the land surface can be constrained from making chattering vibration due to cutting impact and the cutting edge 4 of the land surface 5 can be prevented from being chipped or broken.

The linkage portion 9 is a flat surface as shown in FIG. 6(b), and has the same height as at least the protrusion 8'. In addition, a portion where the land surface 5' and the protrusion 8' are not connected is provided by linking the protrusion 8' which is a part of the central surface 7' and the land surface 5', instead of linking the land surface 5' and the central surface 7' over the entire area thereby to reinforce the land surface 5'. This configuration has effects of suppressing the cutting performance of the side edge 15 of the principal surface 2' from being dulled by the linkage portion 9', and maintaining the cutting performance of the side edge 15 at the cutting edge. A plurality of linkage portions 9 may also be provided so as to further increase the rigidity of the land surface 5' and further improve the stability of seating the throw-away tip 1'. When the throw-away tip 1' is mounted, at least the protrusion 8' and the linkage portion 9 of the principal surface 2' serve as the contact surface. This stabilizes the seating of the throw-away tip 1', suppresses lifting of the cutting edge 4' and chattering vibration and prevents the throw-away tip 1' from being damaged. In order to further stabilize the seating of the throw-away tip 1', it is preferable to make the central surface 7', the land surface 5', the protrusion 8' and the linkage portion 9 all to serve as contact surfaces.

Square throw-away tips called S-type and triangle throw-away tips called T type experience less deformation when sintered, and therefore have better stability of seating, because every corner has the same distance from the center of the throw-away tip. In a diamond-shape throw-away tip wherein the angle of nose 16 is 80° or less, in contrast, there is a difference in the distance from the center of the throw-away tip to each corner. As a result, the diamond-shape throw-away tip is prone to deformation taking place during sintering and consequently unstable seating, and has higher possibility of experiencing defects such as damaged cutting edge. In the case of D type throw-away tip having chip breaker along the entire circumference wherein the angle of nose 16 is 55°, in particular, in addition to unstable seating, larger side length (a) of the principal surface 2' results in insufficient rigidity of the land surface 5', which makes the land surface 5' more likely to undergo chattering vibration. Therefore, the effects of the present invention are more conspicuously demonstrated in case the principal surface 2' has diamond shape and, particularly the apex angle is 55° or less.

Width (b) of the land surface 5' is preferably in a range of .02 mm $\leq b \leq 0.5$ mm, in order to increase the strength of the cutting edge, improve the stability of the land surface 5' and thereby increase the resistance against breakage on the back. This also makes it possible to prevent breakage or chipping through improvement of chip removing performance and suppression of cutting resistance from increasing.

Length (a) of one side edge of the throw-away tip 1' and distance (c) between the nose 16 and the linkage portion 9 preferably satisfy a relationship: $0.25a \leq c \leq 0.75a$, in order to prevent the cutting performance of the throw-away tip 1' from being dulled and the cutting resistance from increasing.

Length (a) of one side edge of the throw-away tip 1' and width (d) of the linkage portion 9 preferably satisfy a relationship: $0.5$ mm $\leq d \leq (a/3)$, more preferably $0.5$ mm $\leq d \leq (a/5)$, in order to increase the strength of the linkage portion 9 and improve the cutting performance of the cutting edge.

Figure 8:
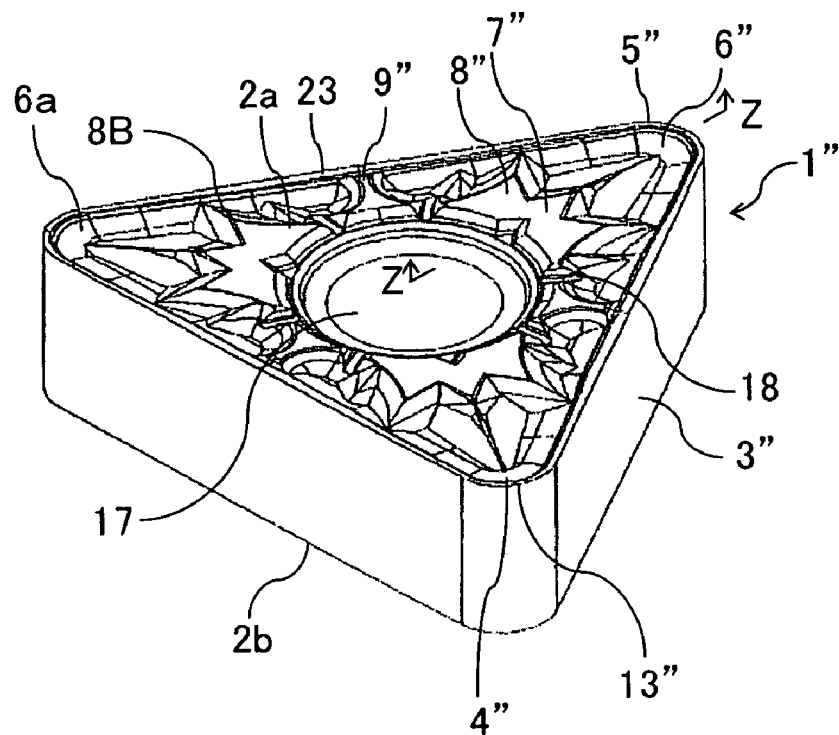
FIG. 8 is a schematic perspective view showing further another embodiment of the present invention.

Now further another embodiment of the present invention will be described below with reference to FIG. 8 through FIG. 11. As shown in FIG. 8, the throw-away tip 1" is a substantially flat plate of polygonal shape having principal surfaces 2a, 2b that form rake faces and seating surfaces, and side surfaces that provide relief faces 3". The throw-away tip has a cutting edge 4" (cutting edge 4a that engages in cutting operation and cutting edge 4b located on the seating surface as shown in FIG. 1(b)) in the intersects of the principal surfaces 2a, 2b and the relief faces 3". A land surface 5" is provided at least along the periphery of the principal surfaces 2a, 2b that form the cutting edge 4", and a central surface 7" is provided on the inside of the land surface 5" so as to interpose a chip breaker groove 6" between itself and the land surface 5". Each of the principal surfaces 2a, 2b can be used as the rake face and the seating surface by turning over the throw-away tip.

Figure 11:
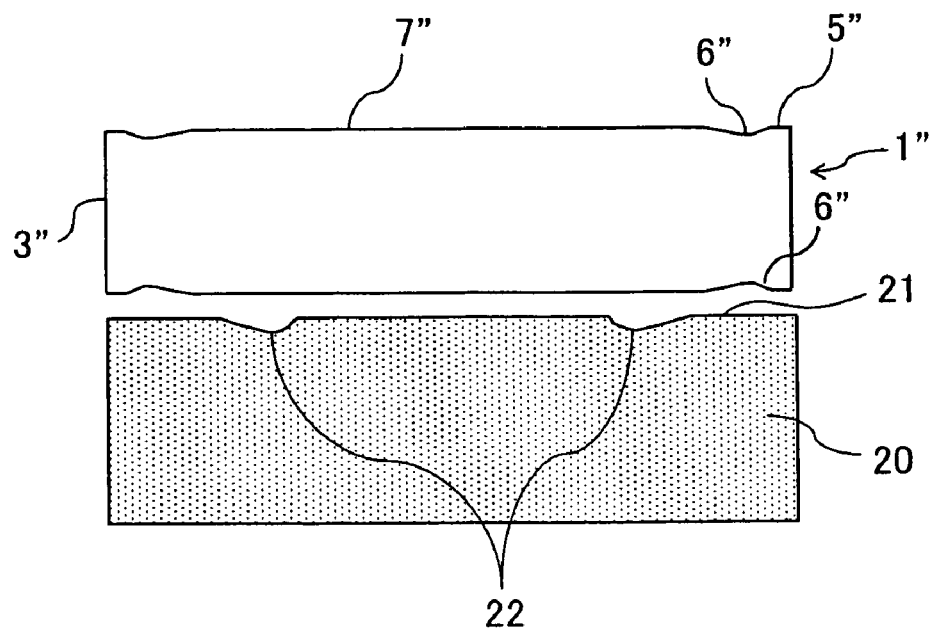
FIG. 11 is a schematic exploded view showing the throw-away tip shown in FIG. 8 through FIG. 10 being attached to a tool holder.

In both principal surfaces 2a, 2b, the land surface 5" and the central surface 7" are formed to the same height so that the land surface 5" and the central surface 7" both serve as the contact surfaces. With this configuration, the land surface 5, that is located along the periphery where the force of constraint is the weakest, vibration is most likely to occur due to the impact during the cutting operation and breakage on the back is likely to occur among all portions of the seating surface 2b, serves as the contact surface together with the central surface 7. As a result, stability of seating of the throw-away tip 1" on the seat surface 21 of the tool holder 20 is greatly improved, as shown in FIG. 11. Therefore, the cutting edge 4b located on the seating surface 2b will not be lifted during cutting operation, and breakage on back and chattering vibration can be suppressed.

In order to make the land surface 5" and the central surface 7" equal in height, the throw-away tip is sintered with the land surface 5" and the central surface 7" being formed to be higher than the desired height, and is machined on the land surface 5 and the central surface 7" in plane grinding process at the same time. Effect of the present invention is not lost even when there is a difference of up to 0.05 mm ($\Delta H \leq 0.05$ mm) in height between the land surface 5 and the protrusion 8 due to variation in the machining process.

Figure 9:
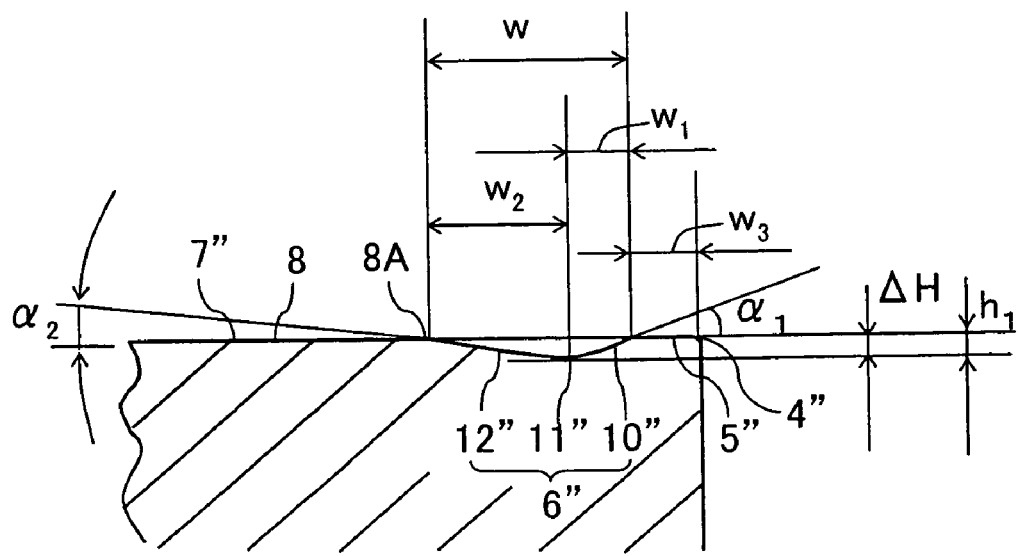
FIG. 9 is a schematic sectional view taken along the line Z—Z in FIG. 8.

The chip breaker groove 6" that continues to the cutting edge 4" and the land surface 5" as shown in FIG. 9 is dimensioned in a range from 0.1 mm to 0.6 mm, particularly from 0.15 mm to 0.3 mm in groove depth $h_1$, from 0.7 mm to 2 mm, particularly from 1 mm to 1.8 mm in groove width w, from 0.3 mm to 1.5 mm, particularly from 0.3 mm to 0.7 mm in width $w_1$ from the land surface side to the bottom of the chip breaker, and from 0.5 mm to 1.7 mm, particularly from 0.75 mm to 1.5 mm in width $w_2$ from the bottom of the chip breaker to the central surface. This dimensioning makes it possible to effectively improve the chip removing performance with very small chip breaker width w, suppress the cutting resistance from increasing and maintain the stability of seating.

When $h_1$ is smaller than 0.1 mm, the effect of warping the chip is lost and the chips extend toward the central surface. When $h_1$ is larger than 0.6 mm, chips tend to jam and makes chattering vibration likely to occur, and the cutting edge tend to receive significant impact and break.

When the value of w is smaller than 0.7 mm, it is difficult for the groove to perform the function of chip breaker, with chips passing over the chip breaker groove so as to extend toward the central surface and be caught between the cutting edge and the workpiece. When the value of w is larger than 2 mm, on the other hand, chip breaking becomes insufficient and, especially when cutting a tough material such as steel, the chips cannot be reliably broken. In addition, stability of eating on the seating surface 2b decreases and the area of the central surface that serves as the contact surface decreases, thus making the seating unstable.

When the value of $w_1$ is smaller than 0.2 mm, the cutting edge receives large impact and tends to break. When the value of $w_1$ is larger than 0.7 mm, the effect of warping the chips is lost. When the value of $w_2$ is smaller than 0.75 mm, cutting resistance becomes excessively high, thus resulting in such problems as the cutting edge 2a tends to break or experience chattering vibration which causes breakage on the back of the cutting edge 4b.

The chip breaker groove 6 as mentioned above is a shape suitable for processing steel especially, and has an excellent chip removal property in cutting process of the workpiece that chips tends to extend and twine.

The chip breaker groove 6 consists of three curves; a first curve 10" having radius of curvature $r_1$ in a range from 12 mm to 18 mm, particularly from 15 mm to 17 mm, a second curve 11" having radius of curvature $r_2$ in a range from 0.1 mm to 0.6 mm, particularly from 0.1 mm to 0.3 mm and a third curve 12" having radius of curvature $r_3$ not smaller than 50 mm, that are connected smoothly in this order from the land surface 5 side. The first curve 10" having radius of curvature $r_1$ has an effect of reducing the cutting resistance. The second curve 11" having radius of curvature $r_2$ has an effect of efficiently warping the chips without compromising the flow of chips, while decreasing the length of the chip breaker groove 6 so as to secure the seating. The third curve 12" having radius of curvature $r_3$ has an effect of smoothly discharging the chips and preventing the tool from being damaged by jamming chips. As a result, the chip breaker groove 6 increases the ratio of the area of the central surface 7 that provides seating, in addition to the effects of chip breaker to reduce the cutting resistance so as to suppress the possibility of chipping and allow smooth removal of chips so as to prevent damage due to jamming chips.

it is preferable that angle $\alpha_1$ between the chip breaker groove 6" and the land surface 5" is in a range from 7° to 25°, particularly from 9° to 15°, and angle $\alpha_2$ between the central surface and the land surface 5" is in a range from 4° to 30°, particularly from 4° to 8°, in order to ensure smooth removal of chips.

When the central surface 7" and the land surface 5" are connected at a position 23 which does not serve as the cutting edge 4" in the periphery of the principal surfaces 2a, 2b, and the linkage portion 9" that serves as the contact surface is provided, the throw-away tip 1 can be suppressed from deflecting during cutting operation, so that an enhanced effect is provided from suppressing such a problem as the cutting edge 4b chatters or is lifted from the seating surface 2b and hits the contact surface 21 of the holder 20.

Figure 10:
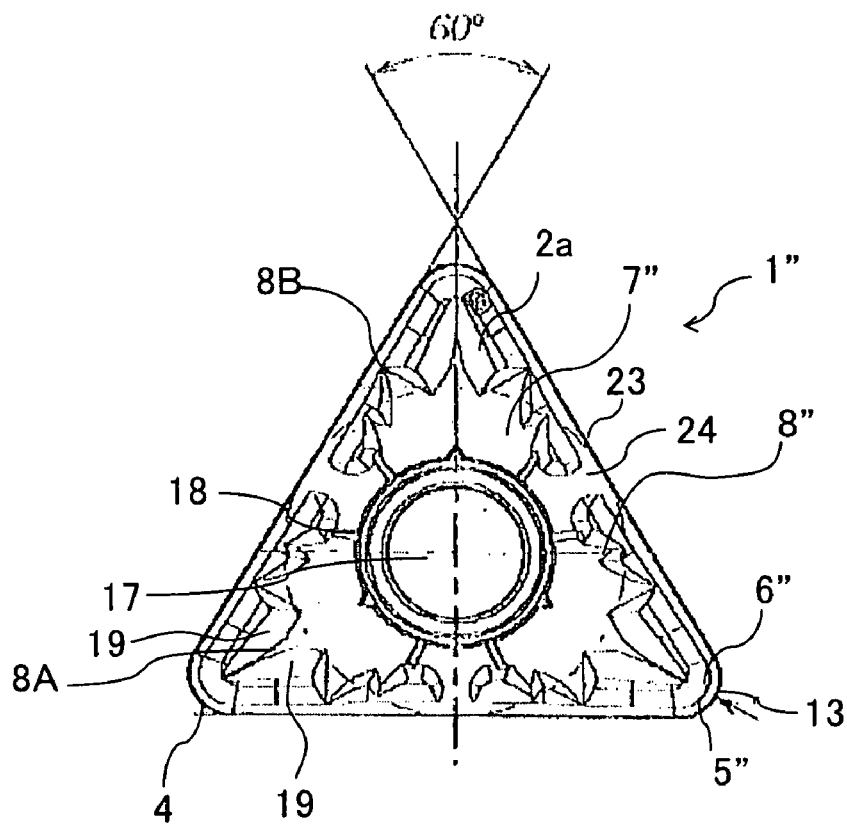
FIG. 10 is a plan view of the throw-away tip shown in FIG. 8.

As shown in FIG. 8 and FIG. 10, the central surface 7" is divided into a plurality of blocks by separation grooves 18. This configuration causes portions located near the corner 13" of the central surface 7" and portions located away from the corner 13" to shrink with different ratios during sintering process, thus enabling it to make pre-adjustment for the deformation during the sintering process.

At least one protrusion 8" is provided to extend over the central surface 7" toward the land surface 5". Even when the throw-away tip 1" is attached to a holder 20 having the contact surface 21 that is worn to form a recess 2 due to the use of a conventional throw-away tip that is contacted only on the central surface over a long period of time, the protrusion 8" located near the land surface 5" serves as the contact surface so that excessive load is not applied to the land surface 5" that includes the cutting edge 4a. Also in case the throw-away tip 1", that has the cutting edge 4a worn out or chipped and the land surface 5" damaged after using one principal surface 2a as rake face, is turned over and mounted but the damaged land surface 5" does not function as the contact surface, the protrusion 8" located near the land surface 5" serves as the contact surface instead of the land surface 5", and therefore stable seating can be maintained.

In the case of such a configuration as the central surface 7", the protrusion 8" and the land surface 5" serve as the contact surfaces as in this embodiment, since the load is distributed over the entire contact surface 21 of the tool holder 20, no recess 22 will be formed on the contact surface 21 of the tool holder 20 after extend period of use.

The shape of the distal end portion of the protrusion 8A that is formed from the central surface 7" toward every corner 13" may have a sharp point with decreasing width formed by concave curves on both sides, a sharp point with decreasing width formed by straight lines on both sides, a sharp point with decreasing width formed by convex curves on both sides or a round protrusion. Among these, sharp point with decreasing width formed by concave curves on both sides is most preferable for the reason of achieving both the stability of seating and chip removing performance by adjusting the proper areas of the chip breaker groove 6 and the central surface 7.

Since one of the protrusions 8" of the throw-away tip 1" extends toward the corner 13", seating is more stabilized. When the chip breaker groove 6 is provided on the extended line of the protrusions 8 that extends toward the corner 13", the direction of removing chips can be made constant so as to achieve higher effect of chip breaking function, with the cutting resistance reduced further. Moreover, it is preferable to provide at least one protrusion 8" that extends toward the side edge other than the corner 13", for further improving the stability of seating. Furthermore, since a chip breaker groove 6a is formed also along the side edge near the corner 13" that is interposed between the protrusions 8B, 8B, the side edge near the corner 13 can also be used as the cutting edge with low cutting resistance and good chip removing performance.

The ratio ($L_2/L_1$) of the distance $L_2$ from the center of the principal surface 2" to the distal end of the protrusions 8" to the distance $L_1$ from the center of the principal surface 2" to the periphery of the principal surface 2" is preferably not less than 0.7, more preferably in a range from 0.8 to 0.95, so as to maintain the stability of seating and chip removing performance and reduce cutting resistance.

The ratio of the total area of the central surface 7 and the land surface 5 in the principal surface 2", namely the ratio of contact surface, is preferably from 50 to 90%, more preferably from 80 to 90%, for stabilizing the seating, improve the chip removing performance, and reduce cutting resistance.

It is also preferable to set the width of the land surface 5 at the cutting edge 4" in a range from 0.2 to 0.5 mm, for increasing the strength of the cutting edge, improving the stability of seating the throw-away tip 1 at the seating surface (contact surface) and increasing the resistance against breakage on the back, as well as for preventing breakage and chipping by improving the chip removing performance and preventing the cutting resistance from increasing.

The cutting edge 4" may be a sharp edge, but it is preferable to provide C surface (chamfer honing surface) or R surface (round honing surface) to the cutting edge 4", for the reason of increasing the strength of the cutting edge and prevent chipping or breakage from occurring on the cutting edge 4".

Also in FIG. 8, protrusions 8B, that are located near the land surface 5" at a distance of 0.5 mm or less, are formed at symmetrical around the plurality of corners 13", 13", with height of the distal end of the protrusion 8B gradually decreasing by an angle in a range from 10 to 60° toward the land surface 5. This configuration makes it possible for the operator to visually check the clearance between the land surface 5 and the distal end of the protrusion 8 to decrease when grinding the principal surface, and therefore it is made easier to carry out the grinding process, so that variation of flatness in the principal surface 2 can be prevented.

As shown in FIG. 10, both the sides 19 and 19 of the protrusion 8" have such a configuration as to slope downward and then rise toward said land surface 5. This makes it possible to secure stable and high chip-processing performance, even when the chip discharge direction is changeable with cutting conditions. Further, even when using as a cutting edge the neighborhood part which separated a few from the corner 13", it is possible to suppress chattering vibration by good chip processing performance and low cutting resistance, both sides of said protrusion.

The following examples illustrate the manner in which the present invention can be practiced. It is understood, however, that the examples are for the purpose of illustration and the invention is not to be regarded as limited to any of the specific materials or condition therein.

EXAMPLE I

A mixed powder prepared by adding 11% by weight of Co to WC powder was pressed to form green compacts of types and specifications shown in Table 1 each having two noses on each side, four noses in all. After being sintered in vacuum, samples I-1 through 6 were ground on the central surface and on the land surface of each principal surface to make the height of the central surface and the height of the land surface equal. In samples I-1 through 6 and 8 through 11, central surfaces were formed so as to protrude in symmetrical configurations at opposing corners, while forming a slope of 45° at the distal end setting the clearance (w) between the distal end of the projection of the central surface and the land surface to 0.2 mm, so that variation in the parallelism during the grinding process could be monitored visually.

Sample No. I-7 was formed in the conventional shape without chip breaker, samples No. I-8, 9 were formed in the conventional shape where the land surface is lower than the protrusion, samples No. I-10, 11 were formed in the conventional shape where the land surface is higher than the protrusion, and sample No. I-12 was formed in the conventional shape where the land surface has the same height as the central surface and the central surface does not have protrusions.

All samples were processed on the periphery of the land surface to provide honed edge, and were coated with a hard film of $TiCN$—$Al_2O_3$—$TiN$ successively by CVD process, thereby making the throw-away tips of No. I-1 through 11.

With the throw-away tips manufactured as described above being placed on a flat plate, maximum value of clearance (h) between the periphery of the land surface and the flat plate, and the position of the distal end of the central surface protrusion (mean value of $L_2/L_1$) were measured. The results are shown in Table 1.

Cutting tests were conducted under the conditions described below using the throw-away tips, while measuring the lift during cutting operation and cutting time before breakage of the throw-away tip, and observing the machined surface of the workpiece. For every sample, the cutting test was conducted with the noses $4a_1$, $4a_2$ of FIG. 1(*b*) and, with the throw-away tip turned over, with the noses $4b_1$, $4b_2$. The results are shown in Table 2.

<Cutting conditions>

Cutting speed: 250 m/min.

Infeed: 4 mm

Feed rate: 0.35 mm/rev.

Workpiece: FC250 with four grooves

Dry cutting

TABLE 1

| Sample No. | Model | h(mm) | $R_1$(mm) | $R_2$(mm) | $R_3$(mm) | $L_2/L_1$ | Ratio of Areas[1] (%) | Land Width(b) (mm) |
|---|---|---|---|---|---|---|---|---|
| I-1 | CNMG120408 | 0 | 16 | 1.2 | 22.9 | 0.9 | 85 | 0.3 |
| I-2 | CNMG120408 | 0 | 16 | 1.2 | 23.1 | 0.7 | 70 | 0.2 |
| I-3 | CNMG120408 | 0 | 16 | 1.2 | 23 | 0.6 | 58 | 0.5 |
| I-4 | CNMG120408 | 0.002 | 15 | 1.8 | 22.3 | 0.8 | 78 | 0.3 |
| I-5 | CNMG120408 | −0.003 | 15.4 | 1.1 | 22.1 | 0.5 | 52 | 0.5 |
| I-6 | CNMG120408 | 0.008 | 16.8 | 1.6 | 23.5 | 0.6 | 67 | 0.3 |
| * I-7 | CNMA120408 | — | — | — | — | — | 100 | — |
| * I-8 | CNMG120400 | −0.2 | 23 | — | — | 0.95 | 94 | 0.2 |
| * I-9 | CNMG120408 | −0.2 | 10 | — | 18 | 0.4 | 42 | 0.6 |
| * I-10 | CNMG120408 | 0 15 | 18 | 3 | 25 | 0.4 | 38 | 0.7 |
| * I-11 | CNMG120408 | 0.1 | 11 | 1 | 17 | 0.35 | 31 | 0.1 |
| * I-12 | CNMG120408 | 0 | 12 | 1 | 19 | — | 40 | 0.2 |

Sample numbers marked with * are not within the scope of the present invention.

[1]Calculated by [(central surface area + land surface area)/principal area] × 100.

TABLE 2

| Sample No. | Cutting Edge 4a₁ | | | Cutting Edge 4a₂ | | | Cutting Edge 4b₁ | | | Cutting Edge 4b₂ | | |
|---|---|---|---|---|---|---|---|---|---|---|---|---|
| | Cutting Time (sec) | Lift (μm) | Machined Surface | Cutting Time (sec) | Lift (μm) | Machined Surface | Cutting Time (sec) | Lift (μm) | Machined Surface | Cutting Time (sec) | Lift (μm) | Machined Surface |
| I-1 | 380 | 2 | Good | 350 | 3 | Good | 330 | 6 | Good | 340 | 5 | Good |
| I-2 | 350 | 5 | Good | 360 | 5 | Good | 320 | 7 | Good | 350 | 6 | Good |
| I-3 | 340 | 6 | Good | 360 | 5 | Good | 330 | 7 | Good | 320 | 8 | Good |
| I-4 | 350 | 5 | Good | 330 | 7 | Good | 310 | 5 | Good | 320 | 8 | Good |
| I-5 | 320 | 8 | Good | 310 | 6 | Good | 310 | 6 | Good | 300 | 7 | Good |
| I-6 | 320 | 6 | Good | 300 | 6 | Good | 320 | 8 | Good | 310 | 9 | Good |
| * I-7 | 300 | 3 | Rough | 290 | 2 | Rough | 280 | 8 | Rough | 290 | 8 | Rough |
| * I-8 | 180 | 65 | Rough | 175 | 70 | Rough | 165 | 83 | Rough | 165 | 72 | Rough |
| * I-9 | 180 | 50 | Rough | 170 | 62 | Rough | 165 | 70 | Rough | 160 | 74 | Rough |
| * I-10 | 190 | 23 | Good | 180 | 22 | Good | 160 | 42 | Rough | 150 | 50 | Rough |
| * I-11 | 200 | 15 | Good | 180 | 15 | Good | 170 | 45 | Rough | 180 | 52 | Rough |
| * I-12 | 280 | 8 | Good | 270 | 9 | Good | 180 | 40 | Somewhat Rough | 175 | 43 | Somewhat Rough |

From Table 2, it can be seen that samples I-1 through 6 where the land surface and at least the protrusion of the central surface were formed at the same height (h≦0.05 mm) showed lifting of not larger than 10 μm at the periphery of the throw-away tip on all cutting edges $4a_1$, $4a_2$, $4b_1$, $4b_2$, long cutting time of 300 seconds or more, no breakage on back at portions other than the cutting edges, no chipping of the cutting edge engaged in machining, and excellent breakage resistance. Observation of the machined surface showed uniformly smooth surface.

In the case of sample No. I-7 without chip breaker, the machined workpiece showed rough surface.

Sample No. I-8, 9 having the land surface lower than the protrusion showed lifting of 50 μm or more and experienced breakage on the back with the cutting edge being chipped in an early stage, thus showing low breakage resistance. Smooth machined surface could not be obtained due to chattering vibration.

Samples I-10, 11 having the land surface higher than the protrusion showed lifting, although to a small extent, and experienced breakage of the land surface on the back. As a result, chattering vibration occurred with the cutting edge being chipped in an early stage, and the machined workpiece showed unsatisfactory surface.

Sample No. I-12, that had the land surface formed to the same height as the central surface without any protrusion on the central surface, showed no lifting during the cutting test using the cutting edges $4a_1$, $4a_2$, with the cutting time as long as about 300 seconds. However, in the cutting test using the cutting edges $4b_1$, $4b_2$ conducted after the cutting test of the cutting edges $4a_1$, $4a_2$, the lands of the cutting edges $4a_1$, $4a_2$ were damaged in the preceding cutting test and did not serve as the contact surface, thus resulting in lifting and a cutting time shorter than that with the cutting edges $4a_1$, $4a_2$ while producing somewhat rough machined surface.

EXAMPLE II

Figure 7A:
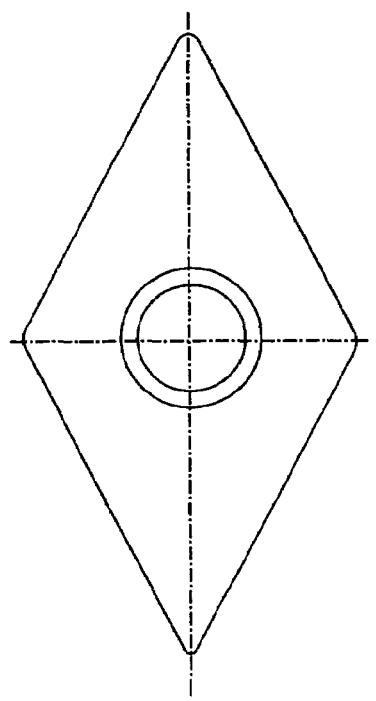
FIG. 7(a) is a schematic plan view of a throw-away tip without chip breaker.
Figure 7B:
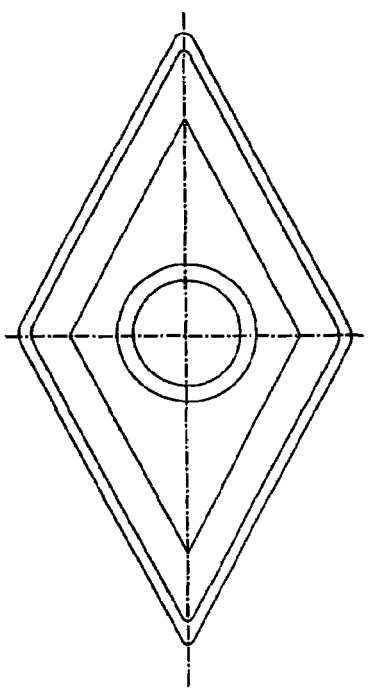
FIG. 7(b) is a schematic plan view of a throw-away tip having an ordinary full-circumference chip breaker.
Figure 7C:
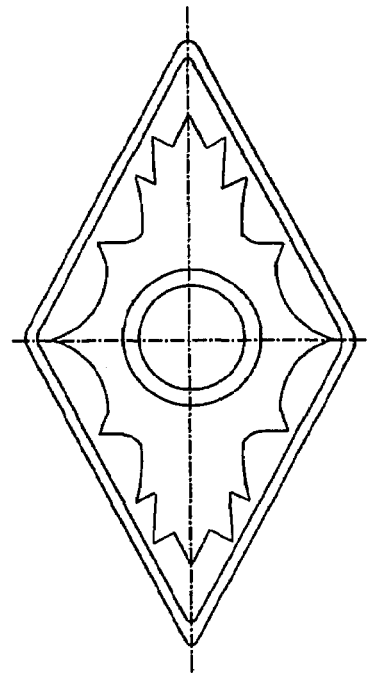
FIG. 7(c) is a schematic plan view of a throw-away tip having protrusion without linkage portion.

A mixed powder prepared by adding 11% by weight of Co to WC powder was pressed to form green compacts that would make sintering of the shapes and dimensions shown in FIGS. 5, 7 and Table 3. After being sintered in vacuum, samples II-1 through 4 were ground on the central surface and on the land surface of each principal surface so as to make the height of the central surface and the height of the land surface equal. Samples II-1 through 8 were formed in diamond shape having nose angle θ of 55° with a linkage portion formed (FIG. 5). Sample No. II-5 was formed in the conventional shape without chip breaker as shown in FIG. 7(a), sample No.II-6 was formed in such a shape that has full-circumference chip breaker while the land surface has the same height as the central surface, without protrusion as shown in FIG. 7(b), and samples No. II-7, 8 were formed in a shape without linkage portion as shown in FIG. 7(c).

All samples were processed on the periphery of the land surface to provide honed edge, and were coated with hard films of TiCN—$Al_2O_3$—TiN successively by CVD process, thereby making the throw-away tips of No. II-1 through 8.

With the throw-away tips manufactured as described above, cutting tests were conducted under the conditions described below while measuring the cutting time before breakage of the throw-away tip and observing the machined surface of the workpiece. The results are shown in Table 3.

<Cutting conditions>

Cutting speed: 250 m/min.

Infeed: 4 mm

Feed rate: 0.35 mm/rev.

Workpiece: FC250 with four grooves

Dry Cutting

Samples II-1' through 7' were prepared similarly to the samples No.II-1 through 6 of Table 3 except for changing the throw-away tip type to C, and were subjected to cutting test similarly to that described above. The results are shown in Table 4.

TABLE 3

| Sample No. | Model | Existence of Linkage portion 9 | c (mm) | b (mm) | d (mm) | Height Difference Between Land and Protrusion(mm) | Cutting Time (sec) | Damage (Back Breakage) | Machined Surface |
|---|---|---|---|---|---|---|---|---|---|
| II-1 | DNMG150408 | Yes | 4 | 0.3 | 3 | 0 | 380 | No | Good |
| II-2 | DNMG150408 | Yes | 8 | 0.2 | 1.3 | 0 | 350 | No | Good |

TABLE 3-continued

| Sample No. | Model | Existence of Linkage portion 9 | c (mm) | b (mm) | d (mm) | Height Difference Between Land and Protrusion(mm) | Cutting Time (sec) | Damage (Back Breakage) | Machined Surface |
|---|---|---|---|---|---|---|---|---|---|
| II-3 | DNMG150408 | Yes | 4 | 0.5 | 1.5 | 0 | 340 | No | Good |
| II-4 | DNMG150408 | Yes | 7 | 0.3 | 2 | 0 | 350 | No | Good |
| * II-5 | DNMA150408 | — | — | — | — | — | 300 | Back Breakage | Rough |
| * II-6 | DNMG150408 | No | — | 0.2 | — | — | 200 | Back Breakage | Somewhat Rough |
| * II-7 | DNMG150408 | No | — | 0.6 | — | 0 | 290 | No | Somewhat Rough |
| * II-8 | DNMG150408 | No | — | 0.7 | — | 0.4 | 50 | Back Breakage | Somewhat Rough |

Sample numbers marked with * are not within the scope of the present invention.

TABLE 4

| Sample No. | Model | Existence of Linkage portion 9 | c (mm) | b (mm) | d (mm) | Height Difference Between Land and Protrusion(mm) | Cutting Time (sec) | Damage (Back Breakage) | Machined Surface |
|---|---|---|---|---|---|---|---|---|---|
| II-1' | CNMG120408 | Yes | 4 | 0.3 | 3 | 0 | 540 | No | Good |
| II-2' | CNMG120408 | Yes | 8 | 0.2 | 1.3 | 0 | 520 | No | Good |
| II-3' | CNMG120408 | Yes | 4 | 0.5 | 1.5 | 0 | 480 | No | Good |
| II-4' | CNMG120408 | Yes | 7 | 0.3 | 2 | 0 | 500 | No | Good |
| * II-5' | CNMA120408 | — | — | — | — | — | 410 | Back Breakage | Rough |
| * II-6' | CNMG120408 | No | — | 0.2 | — | — | 260 | Back Breakage | Somewhat Rough |
| * II-7' | CNMG120408 | No | — | 0.7 | — | 0.4 | 200 | Back Breakage | Rough |

Sample numbers marked with * are not within the scope of the present invention.

From Table 3 and Table 4, it can be seen that samples II-1 through 4 and samples II-1' through 4', where width d of the linkage portion was set in a range from 0.5 mm to a/3, width b of the land surface was set in a range from 0.2 mm to 0.5 mm while the land surface and the protrusion were formed at the same height, showed long cutting time of 300 seconds or more, no breakage on back, no chipping of the cutting edge and excellent breakage resistance. Observation of the machined workpiece showed uniformly smooth surface.

In the tests using samples Nos. II-5, 5' not provided with chip breaker, the machined workpiece showed rough surface due to chattering vibration. Breakage on back also occurred in the contact surface of the throw-away tips.

Samples Nos. II-6 through 8, 6' and 7' experienced chipping on the cutting edge in an early stage and showed rough machined surface due to chipping and chattering vibration. Samples Nos. II-6, 6', 8 and 7' also experienced breakage on back occurring in the contact surface of the throw-away tips.

EXAMPLE III (Example III-1)

A mixed powder prepared by adding 11% by weight of Co to WC powder was pressed to form green compacts of types and dimensions shown in Table 5 having such a pattern as shown in FIG. 8. After being sintered in vacuum, the central surface and the land surface were ground (double-head grinding) on each principal surface to make the height as shown in Table 1 (samples Nos. III-1 through 10).

When grinding the throw-away tips, the protrusions 8A located at the corners 13'' were formed at a distance (w) of 0.2 mm from the protrusion 8A to the land surface in such a shape as to form a downward slope of 45° from the protrusion 8A to the land surface, while setting the clearance (w) between the distal end of the projection and the land surface being monitored visually when grinding the surface, thereby making it possible to achieve machining with high accuracy easily. The samples were processed on the periphery of the land surface to provide honed edge using a brush, and were coated with hard films of TiCN 2 μm thick, $Al_2O_3$ 2 μm thick and TiN 2 μm thick successively by CVD process, with part of the hard film on the cutting edge slightly polished with a whetstone thereby making the throw-away tips.

(Example III-2)

Figure 12:
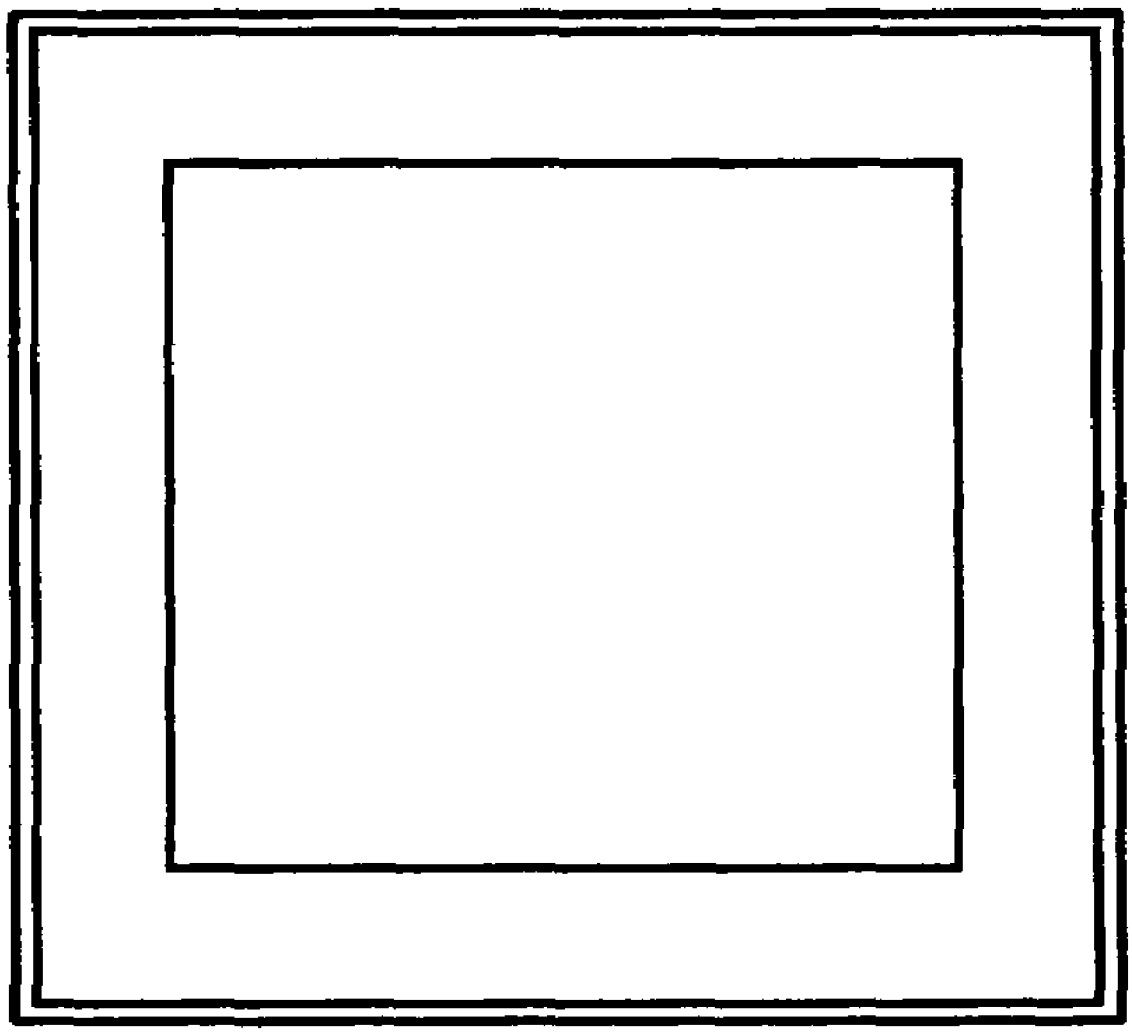
FIG. 12 is a plan view showing the shape of the principal surface of the throw-away tip of Example III-2.
Figure 13A:
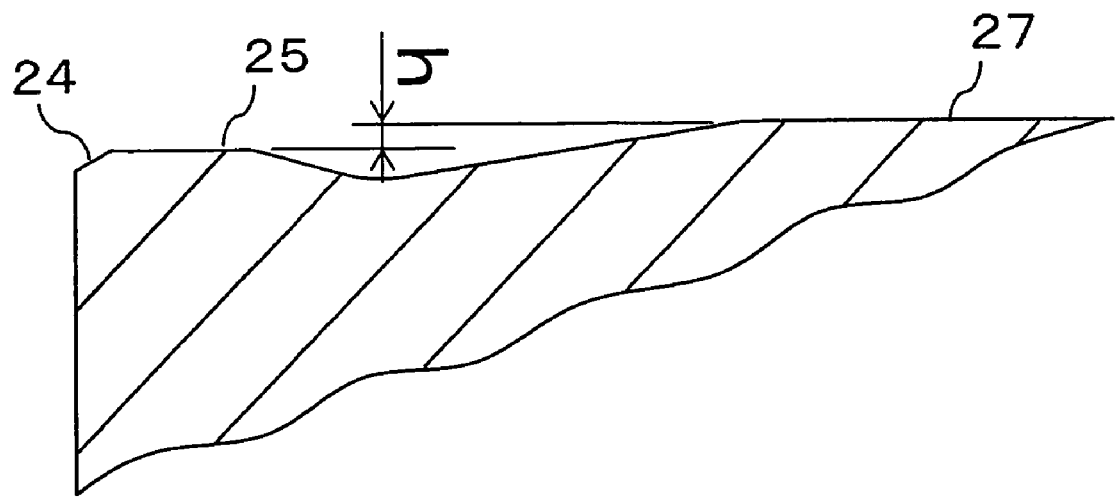
FIG. 13(a) is an enlarged sectional view of a key portion of a throw-away tip of the prior art.
Figure 13B:
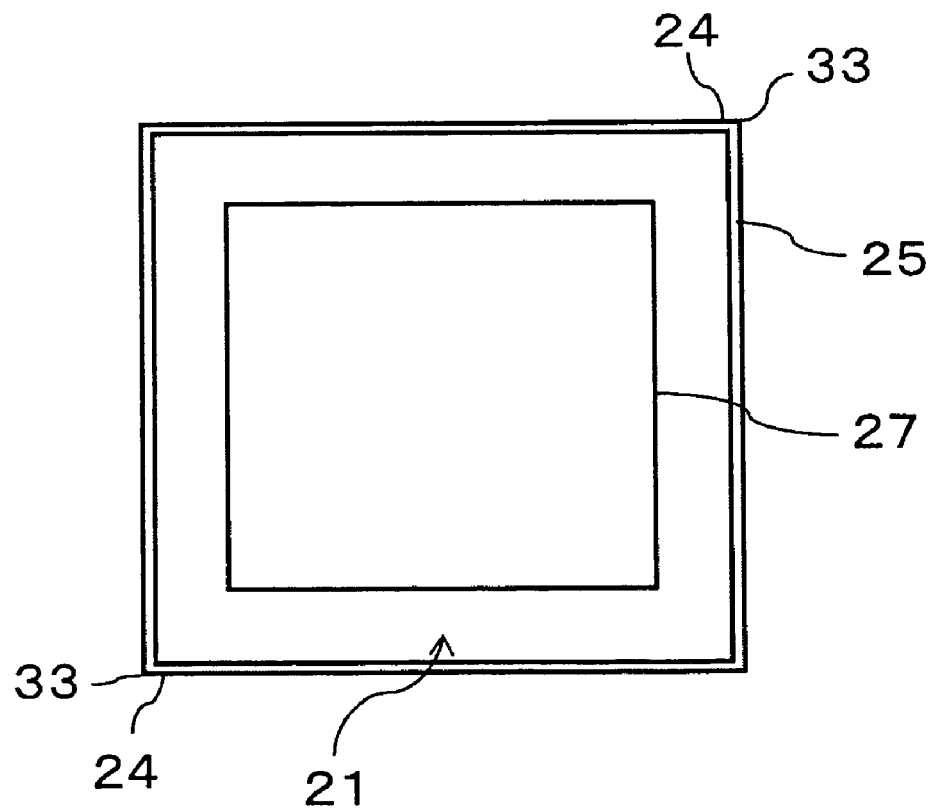
FIG. 13(b) is a plan view of the same.

The throw-away tip of the configuration shown in Table 5 (sample No. III-11) was made similarly to Example III-1 except for providing the pattern of the principal surface with full-circumference chip breaker shown in FIG. 12 to the throw-away tip of the first embodiment.

(Comparative Example)

The throw-away tip of the configuration shown in Table 5 (sample No. III-12) was made similarly to the Example except for forming the principal surface in a single plane without chip breaker on the throw-away tip of the Example.

TABLE 5

| Sample No. | Model | ΔH (mm) | h (mm) | W (mm) | $W_1$ (mm) | $W_2$ (mm) | $R_1$ (mm) | $R_2$ (mm) | $R_3$ (mm) | $L_2/L_1$ | Ratio of Areas[1] (%) | Land Width(b) (mm) |
|---|---|---|---|---|---|---|---|---|---|---|---|---|
| III-1 | TNMG120408 | 0 | 0.2 | 1.47 | 0.53 | 0.94 | 16 | 0.2 | ∞ | 0.92 | 96 | 0.3 |
| III-2 | TNMG120408 | 0 | 0.25 | 1.0 | 0.4 | 0.6 | 14 | 0.3 | 100 | 0.75 | 78 | 0.2 |
| III-3 | TNMG120408 | −0.002 | 0.17 | 1.43 | 0.33 | 1.1 | 16 | 0.5 | 40 | 0.9 | 98 | 0.4 |

TABLE 5-continued

| Sample No. | Model | ΔH (mm) | h (mm) | W (mm) | $W_1$ (mm) | $W_2$ (mm) | $R_1$ (mm) | $R_2$ (mm) | $R_3$ (mm) | $L_2/L_1$ | Ratio of Areas[1] (%) | Land Width(b) (mm) |
|---|---|---|---|---|---|---|---|---|---|---|---|---|
| III-4 | TNMG120408 | 0 | 0.2 | 1.8 | 0.9 | 0.9 | 16 | 1.2 | 22.9 | 0.9 | 95 | 0.5 |
| * III-5 | TNMG120408 | −0.2 | 0.05 | 3.0 | 1.0 | 2.0 | 16 | 0.2 | ∞ | 0.95 | 94 | 0.2 |
| * III-6 | TNMG120408 | 0 | 0.08 | 1.47 | 0.53 | 0.94 | 16 | 0.2 | ∞ | 0.92 | 98 | 0.2 |
| * III-7 | TNMG120408 | 0 | 0.8 | 1.47 | 0.53 | 0.94 | 16 | 0.2 | ∞ | 0.92 | 98 | 0.2 |
| * III-8 | TNMG120408 | 0 | 0.2 | 0.5 | 0.1 | 0.75 | 16 | 0.2 | ∞ | 0.98 | 95 | 0.2 |
| * III-9 | TNMG120408 | 0 | 0.2 | 2.5 | 0.7 | 1.6 | 16 | 0.2 | ∞ | 0.55 | 58 | 0.2 |
| * III-10 | TNMG120408 | 0 | 0.2 | 2 | 1.6 | 0.4 | 16 | 0.2 | ∞ | 0.6 | 70 | 0.2 |
| III-11 | TNMG120408 | 0 | 0.2 | 1.8 | 0.8 | 1.0 | 12 | 1.0 | 19 | — | 40 | 0.2 |
| * III-12 | TNMA120408 | | | | | | — | | | | | |

Sample numbers marked with * are not within the scope of the present invention.
[1] Calculated by [(central surface area + land surface area)/principal surface area] × 100.

With the throw-away tips manufactured as described above being placed on a flat plate, maximum value of clearance ΔH (mm) between the periphery of the land surface and the flat plate was measured, mean value of the distance between the distal end of the protrusion and the land surface ($L_2/L_1$) was determined using a microscope, and the shape of the chip breaker groove was measured, with the result shown in Table 5.

Cutting tests were conducted under the conditions described below using the throw-away tips described above, while measuring the lift during cutting operation and cutting time before breakage of the throw-away tip, and observing the number of breakages on back, condition of chips being removed and the machined surface of the workpiece. For every sample, the cutting test was conducted with the three cutting edges 4a on the principal surface 2b shown in FIG. 8 and, with the throw-away tip turned over, with the three cutting edges 4b on the opposite surface. The results were averaged and are shown in Table 6. Chip removing performance was evaluated by changing the infeed and the feed rate within the ranges described below while observing the chip removing performance over the entire ranges.

<Cutting conditions>

Cutting speed: 150 m/min.

Infeed: 0.7 to 3 mm

Feed rate: 0.2 to 0.5 mm/rev.

Workpiece: SCM435

Wet cutting

TABLE 6

| Sample No. | Number of Dack Breakages | Chip Removing Performance | Cutting Time (sec.) | Lift (μm) | Machined Surface |
|---|---|---|---|---|---|
| III-1 | 0 | ○ | 360 | 0 | Good |
| III-2 | 0 | ⊙ | 340 | 5 | Good |
| III-3 | 0 | ○ | 340 | 8 | Good |
| III-4 | 0 | △ | 340 | 2 | Good |
| *III-5 | 15 | △ | 150 | 65 | Rough |
| *III-6 | 3 | X | 240 | 7 | Rough |
| *III-7 | 0 | X | 210 | 2 | Good |
| *III-8 | 1 | X | 200 | 6 | Rough |
| *III-9 | 0 | X | 250 | 2 | Good |
| *III-10 | 0 | X | 250 | 3 | Good |
| III-11 | 3 | △ | 330 | 8 | Good |
| *III-12 | 0 | X | 290 | 3 | Rough |

Sample numbers marked with * are not within the scope of the present invention

From Table 6, it can be seen that samples III-1 through 4 and 11 where the land surface and at least the protrusion of the central surface were formed at the same height (h≦0.05 mm) with chip breaker of the predetermined configuration showed lifting not larger than 10 μm at the periphery of the throw-away tip while cutting with any of the cutting edges, and long cutting time of 300 seconds or more. The samples III-1 through 4 and 11 showed three or less breakages on back in portions other than the cutting edges, no chipping of the cutting edge engaged in machining, and good cutting performance in terms of both the smoothness of the machined surface and chip removing performance. The samples III-1 through 4 having the protrusion in the central surface as shown in FIG. 8, in particular, showed no breakage on back at all, without such troubles as unstable seating when the throw-away tip is turned over, and stable cutting performance.

The sample III-5 where the land surface was lower than the protrusion, in contrast, showed lifting of 50 μm or more which resulted in lots of breakage on the back. It also experienced chipping of the cutting edge in an early stage, thus showing poor breakage resistance. In addition, smooth machined surface could not be obtained due to chattering vibration.

In the sample III-12 where chip breaker groove was not formed, in addition to poor chip removing performance because of the absence of chip breaker groove, high cutting resistance caused poor cutting, thus resulting in rough machined surface.

The samples III-6 through 10 having the chip breaker grooves of other than the predetermined shape showed, though the lifting was small, poor chip removing performance that caused excessively long chips, jamming of chips and/or the chips being caught between the throw-away tip and the workpiece that forced interruption of the cutting operation. As a result, the cutting edges were broken during cutting and the workpiece showed poor machined surface.

In the Examples described above, throw-away tips of type T were used. In the meantime, samples of type C (CNMG120408) and type D (DNMG150408) having the dimensions of the sample III-1 were made and subjected to similar cutting test and observations. These samples showed good chip removing performance, no lifting, no breakage on back, good machined surface and long cutting time of 400 seconds and 300 seconds, respectively.

What is claimed is:

1. A throw-away tip of substantially flat plate shape comprising two principal surfaces, that provide rake faces and seating surfaces, and side surfaces that provide relief faces, with cutting edges formed on the intersects of the principal surfaces and the relief faces so that the throw-away tip can be used on both sides, wherein each of said principal surfaces comprises a land surface provided along the periphery thereof, a central surface provided on the inside of said land surface, a recess interposed between the land surface and the central surface, and at least one protrusion that extends from the central surface toward said land surface; and at least the top surface of said protrusion and said land surface serve as the contact surface when said throw-away tip is attached to a tool holder, and wherein the ratio of areas of said central surface and said land surface in said principal surface is in a range from 50 to 90%.

2. The throw-away tip according to claim 1, wherein the top surface of said protrusion and said land surface have the same height.

3. The throw-away tip according to claim 1, wherein the top surface of said protrusion is acute-angled at the distal end thereof.

4. The throw-away tip according to claim 1, wherein one of said protrusions extends toward a corner of said throw-away tip and one or more other protrusion extends midway between two corners.

5. The throw-away tip according to claim 1, wherein the ratio ($L_2/L_1$) of the distance $L_2$ from the center of said throw-away tip to the distal end of said protrusion to the distance $L_1$ from the center of said throw-away tip to the periphery of the throw-away tip is in a range from 0.7 to 0.95.

6. The throw-away tip according to claim 1, wherein the width of said land surface is in a range from 0.2 to 0.5 mm.

7. The throw-away tip according to claim 1, wherein said recess comprises three curved surfaces: a first curved surface located on the side of said land surface, a second curved surface that continues to said first curved surface and a third curved surface that continues to said second curved surface and is located on the central surface side.

8. The throw-away tip according to any one of claims 4 through 6, wherein both sides of said protrusion have such a configuration as to slope downward and then rise toward said land surface.

9. A throw-away tip of substantially flat plate shape comprising two principal surfaces, that provide rake faces and seating surfaces, and side surfaces that provide relief faces, with cutting edges formed on the intersects of the principal surfaces and the relief faces so that the throw-away tip can be used on both sides, wherein each of said principal surfaces comprises a land surface provided along the peripheral thereof, a central surface provided on the inside of said land surface, a recess interposed between the land surface and the central surface, and at least one protrusion that extends from the central surface toward said land surface; and at least the top surface of said protrusion and said land surface serve as the contact surface when said throw-away tip is attached to a tool holder; and wherein the distance between the distal end of said protrusion, that is located at the same height as said central surface, and said land surface is 0.5 mm or less and height of the distal end of said protrusion decreases by an angle in a range from 10 to 60° toward said land surface.

10. A throw-away tip of substantially flat plate shape comprising two principal surfaces, that provide rake faces and seating surfaces, and side surfaces that provide relief faces, with cutting edges formed on the intersects of the principal surfaces and the relief faces so that the throw-away tip can be used on both sides, wherein each of said principal surfaces comprises a land surface provided along the periphery thereof, a central surface provided on the inside of said land surface, a recess interposed between the land surface and the central surface, and at least one protrusion that extends from the central surface toward said land surface; and at least the top surface of said protrusion and said land surface serve as the contact surface when said throw-away tip is attached to a tool holder; and wherein the throw-away tip has a linkage portion that connects at least one of said protrusions and the side edge of said land surface, wherein the top surface of said protrusion and said land surface have the same height.

11. The throw-away tip according to claim 10, wherein a length a of one side edge of said principal surface and a distance c between a corner having an angle of 90° or less and said linkage portion satisfy a relationship: $0.25a \leq c \leq 0.75a$.

12. The throw-away tip according to claim 11, wherein said principal surface has diamond shape.

13. A throw-away tip of substantially flat plate shape comprising two principal surfaces, that provide rake faces and seating surfaces, and side surfaces that provide relief faces, with cutting edges formed on the intersects of the principal surfaces and the relief faces so that the throw-away tip can be used on both sides, wherein each of said principal surfaces comprises a land surface provided along the periphery thereof, a central surface provided on the inside of said land surface, a recess interposed between the land surface and the central surface, and at least one protrusion that extends from the central surface toward said land surface; and at least the top surface of said protrusion and said land surface serve as the contact surface when said throw-away tip is attached to a tool holder, and wherein the throw-away tip has a linkage portion that connects at least one of said protrusions and the side edge of said land surface, wherein a length a of one side edge of said principal surface and a width d of said linkage portion satisfy a relationship: $0.5 \text{ mm} \leq d \leq (a/3)$.

14. A throw-away tip of substantially flat plate shape, comprising two principal surfaces, that provide rake faces and seating surfaces, and side surfaces that provide relief faces, with at least the corner portions of the intersects of the principal surfaces and the relief faces are used as cutting edges such that the throw-away tip can be used on both sides, wherein each of said principal surfaces comprises a land surface provided at least along the periphery thereof that forms said cutting edge, a central surface provided on the inside of said land surface, and a recess interposed between the land surface and the central surface;

when one of said principal surfaces is the seating surface, both the central surface and the land surface of this principal surface serve as the contact surface; and said recess that continues from said land surface in said corner portion is dimensioned in a range from 0.1 mm to 0.6 mm in recess depth ($h_1$), from 0.7 mm to 2 mm in recess width (w), from 0.3 mm to 1.5 m in width ($w_1$) from the land surface side to the bottom of the recess, and from 0.5 mm to 1.7 mm in width ($w_2$) from the bottom of said recess to said central surface.

15. The throw-away tip according to claim 14, wherein said recess that continues from said land surface in said corner portion comprises three curves; a first curve (10")

having radius of curvature ($r_1$) in a range from 12 mm to 18 mm, a second curve (11″) having radius of curvature ($r_2$) in a range from 0.1 mm to 0.6 mm and a third curve (12″) having radius of curvature ($r_3$) not smaller than 50 mm, that are connected smoothly in this order from said land surface side.

16. The throw-away tip according to claim 14, wherein a linkage portion is provided that connects said land surface and said central surface at a position of the periphery of said principal surface which is not used as a cutting edge, thereby providing a contact surface.

17. The throw-away tip according to claim 14, wherein at least one protrusion that extends toward said land surface is provided on said central surface.

18. The throw-away tip according to claim 17, wherein said protrusion is formed to have a sharp point.

19. The throw-away tip according to claim 17, wherein one of said protrusions extends toward said corner portion.

20. The throw-away tip according to claim 14, wherein a ratio ($L_2/L_1$) of the distance $L_2$ from the center of said throw-away tip to the distal end of said protrusion to the distance $L_1$ from the center of said throw-away tip to the periphery of the throw-away tip is in a range from 0.7 to 0.95.

21. The throw-away tip according to claim 14, wherein a ratio of areas of said central surface and said land surface in said principal surface is in a range from 50 to 90%.

22. The throw-away tip according to claim 14, wherein a width of said land surface is in a range from 0.2 to 0.5 mm.

* * * * *